United States Patent Office 3,393,512
Patented July 23, 1968

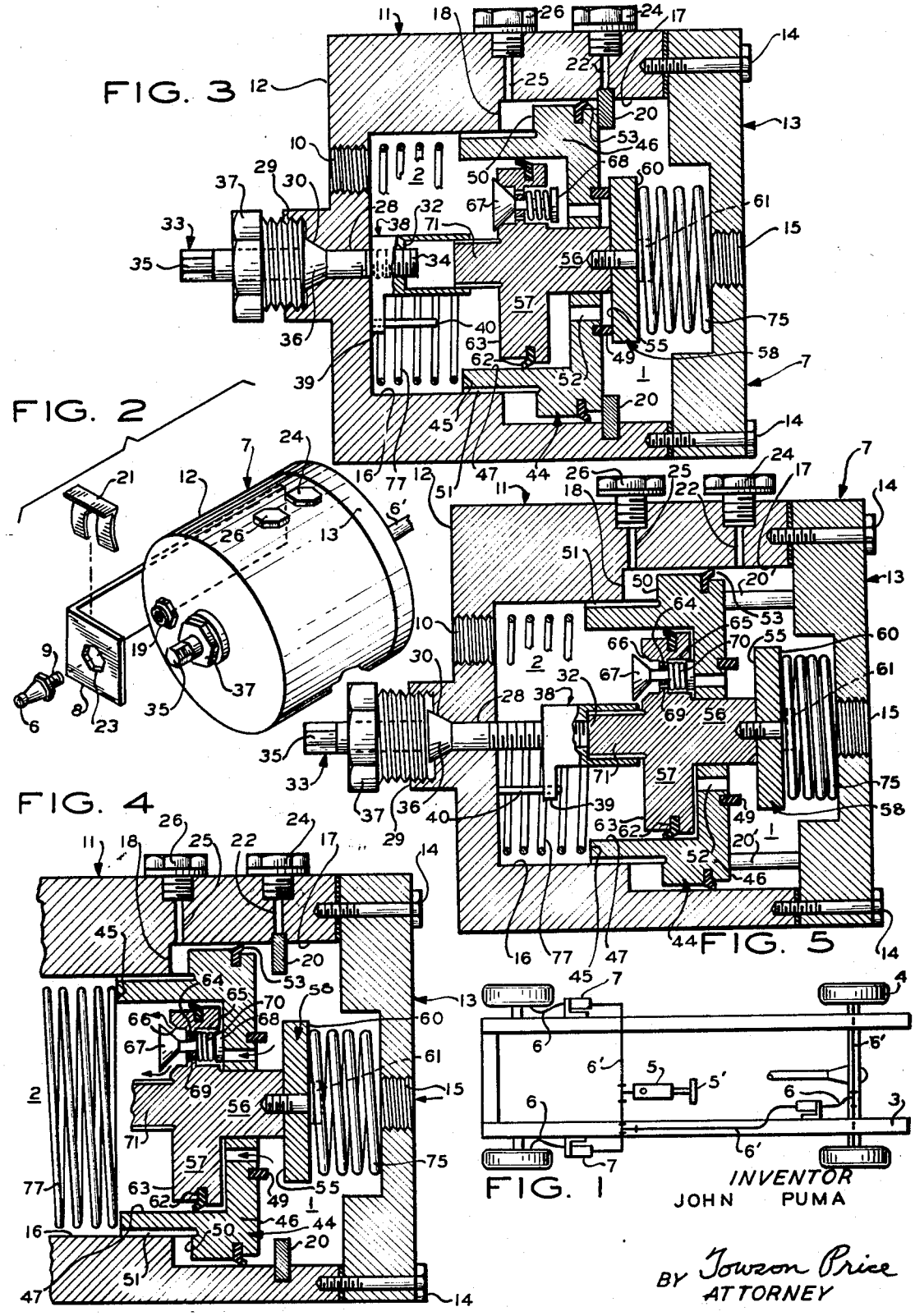

3,393,512
HYDRAULIC BRAKING SYSTEM WITH
SAFETY DEVICES
John Puma, 65 Davenport Ave.,
Newark, N.J. 07107
Filed Jan. 25, 1967, Ser. No. 611,614
13 Claims. (Cl. 60—54.5)

ABSTRACT OF THE DISCLOSURE

A safety device including bleeding means, particularly adapted to stop the leakage from an hydraulic brake system of an automobile, in which at one end a cylinder of said device receives hydraulic fluid from the master cylinder and discharges it to the wheel cylinders at the other end, wherein there is a pair of telescoping pistons reciprocable in the device cylinder, with the outer one apertured for the flow of fluid therethrough, a valve in the inner piston spring-biased to closed position, means for checking the flow through the outer piston when the inner piston moves therefrom, and a spring at each end of the device cylinder for urging the pistons away from one another.

---

This invention relates to safety devices for vehicle hydraulic braking systems and also to such systems including one or more of my novel safety devices.

In conventional hydraulic brake systems, drum or disc type, as used on motor vehicles such as automobiles and trucks, a number of brakes, generally four, are operated by a brake pedal from a single pressure source, commonly known as a master cylinder, containing hydraulic fluid, in communication with individual conduits extending therefrom, one towards the rear wheels, and another toward the front wheels, and branching to individual hose. These hose go to conventional elements, commonly known as wheel brake cylinders, to be actuated thereby to apply force to brake shoes or pads to effect braking action against the wheel brake drums or discs, respectively, of the vehicle. Should a rupture occur at any point of the hydraulic brake system, some of the fluid will be lost, whereby all of the brakes will be rendered inoperative, thereby causing the vehicle to become a source of danger to the occupants of the vehicle as well as to others, especially in such cases where the vehicle is in motion.

In an hydraulic brake system of most recent innovation, drum or disc type used in vehicles, some margin of safety is effected by the use of a system as before described, except that the master cylinder is essentially two cylinders integrated as one master cylinder unit, but with one piston shaft. Such is known as a "two-brake" system. One cylinder of the integrated unit is for operating only the two front-wheel brakes and the other cylinder is for operating only the two rear-wheel brakes. A rupture occuring at any one point of this hydraulic brake system will cause only the two wheel brakes to which the ruptured point is common to become non-operational.

Prior to this invention, many others have recognized the necessity for providing safety devices in such brake systems which would close off from further fluid communication with the hydraulic brake system any burst flexible hose and the wheel brake cylinder or cylinders connected thereto, to permit continued operation of the other wheel brakes. For one reason or another, none of the many such proposed safety devices has been found commercially acceptable. Insofar as I know, none of the conventional vehicle braking systems includes any of them. So, after the many years that the art has recognized the necessity for such safety devices in braking systems, this long felt want has previously not been satisfied, except to a limited extent when using a two brake system.

The safety devices of my invention, not being dependent on any particular hydraulic brake system for their efficient safe operation, and where the custom of the land dictates that a "two-brake" system, as before described, must be used, they can be added, as will be generally described herein, to supplement or "back-up" the "two-brake" system, but principally for use without it.

An object of my invention is to provide a safety device of relatively simple design, inexpensive to manufacture, and which when applied to a single hydraulic brake system of a motor vehicle, serves to eliminate brake failure, even if one of the flexible fluid conduits of said system were to leak.

Another object is to provide such a device at the master-cylinder-connected end of the flexible fluid conduit to each brake, to check the leakage of brake fluid upon failure of any of said conduits.

A further object is to provide such a device with convenient and effective "bleeding" means.

These and other objects and advantages will become apparent from the following detailed description when taken with the accompanying drawings. It will be understood that the drawings are for the purposes of illustration and do not define the scope of limits of the invention, reference being had for the latter purpose to the appended claims. In the drawings:

FIGURE 1 is a diagrammatic plan of the chassis of a motor vehicle embodying my invention.

FIGURE 2 is an exploded perspective view to show how the novel safety devices are connected to the chassis of a motor vehicle for use in its hydraulic braking system.

FIGURE 3 is a view partly in section and partly in side elevation of an illustrative embodiment of the novel safety devices of the present invention, which parts shown relatively disposed to each other at their normal position of rest, as when there is no application of force to the vehicle brake pedal.

FIGURE 4 is a view as in FIGURE 3, except that the parts are shown disposed relative to each other at their approximate extreme operative positions at an instant of time during increasing application of force to the vehicle brake pedal. The extent to which the parts are offset from their positions in FIGURE 1 is dependent on the intensity of the force applied to the pedal.

FIGURE 5 is a view as in FIGURE 3, except for a slight modification and with the parts shown disposed relative to each other, in preparation for filling with hydraulic brake fluid and the resultant complete absence of air in the safety device.

Referring to the drawings in detail, there is represented in FIGURE 1, a chassis 3 of a typical motor vehicle having four wheels 4 and controlled by wheel brakes such as the presently-known drum or disc type. These brakes are actuated by one or two hydraulic cylinders (not shown) per wheel, the number of brake cylinders used being dependent on the manufacturer's design.

Hydraulic brake fluid, being contained within the entire system, is caused in part to transfer from and return to a master cylinder 5 under control of a brake pedal 5', through hard metallic conduits or fluid supplying lines 6', novel safety devices 7 embodying my invention, and then through flexible fluid-transmitting conduits or lines 6 to wheel brake cylinders. It is common practice in the art of hydraulic brake systems to provide steel tubing throughout the entire system except at those points where there is turning and flexing motion, such as at each of the front wheels, and at the rear end housing. An hydraulic flexible hose is provided at each of such points. Also, in the art of hydraulic brake systems, it is acknowledged that the weakest fluid pressure parts of an hydraulic brake system are the flexible hose. These hose are more easily subject to bursting, especially in view of the torsional and flexing strains to which they are subjected.

A safety device 7, as shown in detail in FIGURE 3, is interposed in fluid communication with the fluid entering end of each hydraulic flexible brake hose 6 and the fluid exit end of each corresponding hydraulic hard line 6', as shown in FIGURE 1. This permits the other front wheel brake and the two rear wheel brakes to remain operational if a front flexible hose should burst. It also permits the two front wheel brakes to remain operational if the rear chassis-to-axle-housing flexible hose should burst.

Since it is desired, particularly for the heavier vehicles, and especially on down grade and/or panic stop situations, to have three wheel brakes remain operational at the instant of the bursting of any one flexible hose, it is necessary to have one flexible hose per wheel brake as shown in Patent No. 2,546,751, issued to L. T. Jackson on Mar. 27, 1951. Each of the four flexible hose are to be connected to one of the safety devices shown in FIGURE 3.

FIGURE 2 illustrates one form of mounting each safety device 7 on the chassis 3. A suitable L bracket 8, the long section rigidly attached to the chassis and the short section extending at an angle therefrom, is located immediately before each flexible hose 6 at a point to permit maximum easy flexing of said flexible hose when threaded to the safety devices in fluid-tight relationship. A coupling 19 having an externally threaded stud at one end, a hex flange whose thickness is slightly less than the thickness of the L bracket 8, and an external annular groove is desirably used. A hose 6 with an externally threaded end portion 9 extends longitudinally through the bracket opening 23 and engages an internally threaded coupling portion. Each coupling 19 is threadably connected at its stud end to the internally threaded opening 10 in the body 11 of a device 7.

Each coupling 19 is fluidly sealed at its hex flange by a rubber-like O-ring around the stud end, with the external face of the closure 12 of said body 11. Each is also inserted through the hex opening 23 of its L bracket 8, until its hex flange has fully penetrated said opening. Each coupling 19 is secured to a bracket 8 by a bifurcated retainer clip 21 having both legs bowed to prevent rattling, with said legs fully inserted into the annular groove of the coupling. The legs after assembly are bent towards one another at their ends to lock each clip in place. The upper or bent tab of each retainer clip 21 is provided for disassembly or replacement. The fluid exit end of each hard line 6' is made fluid-tight by being threadably connected to internally threaded opening 15 of the closure 13 for its body 11.

As shown in FIGURE 3, each novel safety device 7 comprises a rugged hollow cylindrical body or member 11 made by uniting a closure 12 at one end thereof and a closure 13, to define a hollow cylinder. The latter closure demountably secured to the former by stud-bolts 14 and forms a fluid-tight closed chamber, with a threaded central inlet opening 15 through closure 13 for the passage of fluid under pressure in either direction through a fluid-supplying conduit 6' between said chamber and a conventional master cylinder 5 of a conventional vehicle braking system and the threaded opening 10 in closure 12 for the passage of fluid through a fluid-transmitting conduit 6 between said chamber and a brake cylinder (not shown) of a conventional vehicle wheel brake such as previously referred to. Said chamber may include a cylinder 16 in axial alignment with a cylinder 17, with the diameter of cylinder 17 here shown greater than that of cylinder 16 and thus defining an annular stop 18 therebetween as one form for limiting the extent of travel axially in one direction of a reciprocable piston 44 disposed in the cylinder 17.

Carried by said cylinder 17 and extending from a wall thereof near one end is a stop member 20 (FIGURES 3 and 4) which in this specific embodiment is of annular form and as a snap-ring only partially disposed in an internal recess in the wall of cylinder 17. If desired, an alternate stop may be in the form of narrow studs 20' (FIGURE 5) spaced about 90° apart and carried by closure 13 and extending into the cylinder 17. The cylindrical member 11 has an air bleed hole 22 therein near the closure 13 and in communication with a threaded opening associated with an adjustable bleed cap and washer 24. And in this specific embodiment the bleed hole 22 is in communication with the cylinder 17 through the recess in which the snap-ring 20 is located.

The member 11 has another air bleed hole 25 therein in communication with a threaded opening associated with an adjustable bleed cap and washer 26. Bleed hole 25 is located near the other end of cylinder 17 and is in communication with cylinder 16. The closure 12 has therein a centrally disposed opening 28, part of which is internally threaded at 29, and another part of which is a valve seat 30. A screw pin 33 extends through said opening 28. One end of pin 33 is threaded at 34 and its other end 35 is of hexagonal form. The intermediate part of pin 33 is formed frusto conical to function as a valve 36 adapted to be disposed on correspondingly shaped seat 30 for sealing.

An externally threaded sealing nut 37 through which extends a pin 33, makes threaded engagement with a threaded part 29. Said nut 37 adapted to be turned to cause the valve 36 to firmly engage the seat 30 for fluid-tight sealing. A cylindrical dual internal diameter but generally cup-shaped element 38, whose small diameter, the left-hand one as illustrated, is internally threaded and located in cylinder 16. It is operatively threadably coupled with the threaded end 34 of pin 33 whose free terminus is located in the larger diameter unthreaded part of element 38. Said element 38 has an internal shoulder 32. Integral with and depending from element 38 is a rod 39, whose lower end is bifurcated to straddle or receive a stop rod 40 secured to and projecting inwardly from the closure 12. Rod 40 passes between the bifurcations to prevent rotation of element 38.

There is provided an outer piston 44, which may be stepped to have two outer diameters, the large diameter is located in cylinder 17, the smaller diameter is located in cylinder 16. Said piston makes an easy slip fit which is preferably non-sealing with only the cylinder 16 so as to be aided by said cylinder in supporting and maintaining it in correct alignment. To effect the nonsealing fit of the piston 44 in cylinder 16, it is preferred to have undercuts or grooves 51 extending along the longitude of the piston outer face thereat. If desired, the grooves 51 may instead be similarly located on cylinder 16. Said piston 44 has a head 46 which has a circular opening at its center. Said head 46 being here of greater diameter than the cylinder 16, terminates in a stop shoulder 50 and has a number of openings 52 extending therethrough radially interposed from a central opening. Integral with piston 44 and extending from the inner face of the head 46 thereof is a hollow cylindrical portion 47 which extends from the cylinder 17 into the cylinder 16.

In this embodiment, at its greater outer diameter, the piston head 46 has an external annular recess and is further stepped to a smaller diameter from this annular recess to its head terminus to accommodate and hold in place a U-cup 53 of rubber or of any other appropriate resilient composition and/or shape. The U-cup 53 makes slideable fluid-tight sealing with cylinder 17 and is regarded as part of piston 44. The head 46 has a narrow circular groove in the external face thereof concentric with the central opening therein and radially outward of the openings 52. Disposed and locked in said groove of head 46 thereat is an annulus or O-ring 49 of deformable, resilent or rubbery material, and extending outside of said groove.

The piston 44 including its sealing means 53 together with cylindrical portion 47 and O-ring 49 represent an outer piston or first sub-assembly which is combined with an inner piston or second sub-assembly to form a main assembly. The inner piston or second sub-assembly comprises cylindrical connector 56, which with or without appropriate packing as part thereof as may be required, extends through a central opening in piston head 46 and is in slideable relationship with the cylindrical wall defining said opening. Centrally disposed at one end of said connector 56, is a disc head 58 functioning as a combined separable piston head section and valve disc having a fluid sealing face 55 and a fluid pressure receiving face 60. This disc head 58 is secured and fluidly sealed to the connector 56 by a stud bolt 61. Integral with, centrally disposed at the other end of said connector 56, and telescoped in the cylindrical part 47 is an inner piston 57.

The effective annular fluid pressure receiving face 63 of the inner piston 57 is of greater area than that of the effective annular fluid pressure receiving face 60 of head 58. The piston 57 has an external annular recess and is further stepped to a smaller diameter from this annular recess to its head terminus to accommodate and hold in place a U-cup 62 of rubber or of any other appropriate resilient composition and/or shape. The U-cup 62 makes fluid-tight sealing with cylinder 47 and is regarded as part of piston 57. Said piston 57 has an opening 65 therethrough, part of which defines a valve stem guide 64. A number of fluid flow holes 69 are radially disposed from guide 64 and circumferentially spaced to form a web integral with piston 57, and a frusto-conical valve seat 66. A valve 67 has a stem which slideably fits through guide 64, extends through the opening 65 and terminates at a disc foot 68.

A compression spring 70 is located in a part of opening 65 and bears against the integral guide carrying web of piston 57 at one end and the disc foot 68 at the other and thereby continuously exerts force on the valve 67 and constantly tends to maintain it on its seat 66 for fluid sealing. Integral with and extending from the face 63 of piston 57 is a concentrically disposed centering portion 71 having a number of grooves or undercuts in axial relation thereto. The centering portion 71 extends into the element 38, and makes a slip-fit but not a sealing fit therein, so that fluid may pass in and out of element 38, but the element 38 is partially supported thereby.

A first compression coil spring 75 is located in the cylinder 17 and in an interior recess of closure 13 and bears force against the head face 60 but in opposition and to the closure 13, thereby continuously exerting axial force on the inner piston or second sub-assembly, always tending to move said second sub-assembly axially towards the closure 12 and the head 58 thereof towards the piston head 46. A second compression coil spring 77 is located in the cylinder 16 and bears force against the small diameter end 45 of outer piston 44 but in opposition and to the closure 12 thereby continuously exerting axial force on the first sub-assembly, always tending to move said sub-assembly axially towards closure 13, and piston 44 thereof towards head 58 and against stop ring 20 or studs 20', as the case may be. The combined effect of springs 75 and 77, other than to return their respective sub-assemblies to their at-rest positions, spring 77 being substantially stronger than spring 75, is to cause and maintain head face 55 and O-ring 49 in a sealed condition with respect to each other, except when the sealed condition is disturbed as described herein.

Primary cavity 1 is a fluid-pressure receiving cavity, in direct communication with the pressure source through opening 15, whose at-rest closures are as defined by piston head 46, U-cup 53, O-ring 49, head 58, cylinder 17, and closure 13. Secondary cavity 2 is essentially a fluid-pressure-sensing cavity, in direct communication with the wheel brake element or elements thru opening 10. Its closures, assuming U-cup 53 in a sealed condition as when under influence of pressure in cavity 1 but with no parts displaced from their at-rest position, are as defined by cylinder 47, piston 57, valve head 67, U-cup 62, piston 44, cylinder 17, cylinder 16, and closure 12.

After making certain that the entire system including the safety devices, is completely filled with hydraulic fluid and entirely absent of air, the unique operation of each of the novel safety devices is as follows:

(1) With no force applied to brake pedal, the parts of the device are at rest and disposed relative to each other as shown in FIGURE 3. The fluid pressure is approximately zero and there is no transfer of fluid.

(2) Force applied to the brake pedal at any continuously increasing rate, simultaneously causes a corresponding fluid-pressure increase throughout the entire vehicle hydraulic brake system, including the safety devices, the parts thereof then being disposed relative to each other as shown in FIGURE 4. This simultaneous increase in fluid pressure is transmitted by the flow of fluid from the steel line, through the central openings 15 to each of the primary cavities 1. As is known in the art, any pressure applied to any part of an enclosed fluid is transmitted equally in all directions. This pressure accordingly acts on each piston head 46 and head face 60, these members while being sealed respectively by U-cup 53, and O-ring 49 to head face 55. Fluid pressure thereat causes each outer piston 44, a component of sub-assembly 1, and each head 58, a component of inner piston of sub-assembly 2 to move axially as a single unit towards its closure 12.

As any unit motion of these sub-assemblies towards closure 12 tends to displace fluid from each secondary cavity 2 through its respective flexible hose and to the wheel brake element, the fluid displacement being only to the extent that fluid pressure begins to build up in secondary cavity 2, the displacement thereat is equal to the fluid entering the primary cavity 1 from the pressure source. At the instant of this fluid pressure build-up in each secondary cavity 2, said build-up acts on face 63 of each inner piston 57, each valve head 67 being closed on seat 66, and U-cup 62. Since the area of piston face 63 with its U-cup is larger than the resulting area of head face 60 produced when the contact diameter of O-ring 49 at face 55 is a function, the difference between the products of pressure times areas will cause motion of each 2nd sub-assembly axially towards its closure 13, separating its head face 55 from its O-ring 49.

This causes each disc foot 68 to contact the rear face of its piston head 46 and separates the valve head 67 from its seat 66, opening a continuous fluid path for the transfer of fluid from each primary cavity 1, past each O-ring 49, through each of the openings 52, 65, 69, past each valve 67 and to each secondary cavity 2. The details of each safety device are now relatively disposed to each other as shown in FIGURE 4 and the wheel brakes are now under direct control of the brake pedal, as though the safety devices were not in the lines. To this point, mention of springs 75 and 77 has been purposely avoided as they do not change any of the sequences leading and resulting in the parts being relatively disposed as shown in FIGURE 4, but by varying their relative working forces, they will change the instant of transition during fluid pressure build up, when the parts begin to approach their relatively-disposed positions as shown in FIGURE 4.

However, if and when the force applied to the braking pedal is not further increased, but maintained at any particular level, each spring 77 acting against its edge 45 forces the outer pistons 44, components of sub-assemblies 1, to move towards and against stops 20, or 20', as the case may be and the springs 75 acting against the head faces 60 cause the second sub-assemblies to travel in the opposite direction, whereupon valves 67 engage their valve seats 66 to close the openings 65 through pistons 57, and the head faces 55 contact O-rings 49 and are maintained under spring force to provide effective fluid sealing thereat. Thus the head faces 55, their rings 49, and all parts are returned to the normal position shown in FIGURE 3. During this maintained pedal force, the pressure in each secondary cavity 2 remains the same as the built-up pressure and is the same as that in each primary cavity 1 because there is no transfer of fluid from one cavity to the other. When further increase in braking is effected, the operation of the devices as before described is repeated, but at increased fluid pressures.

Upon diminishing the force on the brake pedal or the complete release thereof, the pressure in each primary cavity 1 becomes diminished and, therefore, the pressure in each secondary cavity 2 is greater than that in its primary cavity 1. Consequently, each secondary cavity 2 pressure acts on its piston face 63 to cause the second sub-assembly to travel towards closure 13 and disturb the sealed condition of the O-ring 49 and head face 55. This forces each disc foot 68 against the rear face of its piston head 46 to unseat the valve 67, whereby there occurs transfer of fluid from each secondary cavity 2 to its primary cavity 1, past an open valve 67, through openings 69, 65, 52, and an O-ring 49 and thence to the master cylinder. The amount of fluid transfer back into the master cylinder is dependent upon the degree to which the pedal force has been diminished or completely released.

Assuming that the brake pedal is being subjected to increasing force, with the parts of the safety device disposed relative to each other as shown in FIGURE 4 with the fluid being in a continuous path from the master cylinder to the wheel brake elements and through its connecting flexible lines, and that one of said flexible lines bursts. Immediately thereafter, the pressure of the fluid in the corresponding secondary cavity 2 is released and consequently the pressure on face 63 drops to practically zero, whereupon the spring 75 automatically causes the second sub-assembly to travel towards the closure 12, whereupon the valve 67 is moved to closed position by spring 70. The sealing ring 49 then forms a fluid-tight seal against head face 55 to prevent any flow of fluid thereat.

Because of the pressure in the primary cavity 1, be it held, increased, or reapplied by corresponding force at the brake pedal, the main assembly moves towards the closure 12 until piston terminus stop 50 abuts the annular cylinder stop 18. Removing the force of the brake pedal consequently zero's the fluid pressure in the primary cavity 1, and spring 77 acting on piston end 45 moves the entire main assembly towards the closure 13 til the piston head 46 abuts the stop 20 or 20', the spring 75 maintaining the head 46 and head face 55 in relative sealing condition at the O-ring 49. When the parts are in such final relative position, as before described, the novel safety device acts as an effective closure against further loss of fluid from the burst hose, so that the other brakes remain operational.

Continued use of the brake pedal, knowing the resulting pressure consequences, and with the parts disposed to act as said effective closure, the entire main assembly will travel between the limits of cylinder stop 18 and stop means 20 or 20' as before described, with each application and removal of pedal force. The distance between stops 20 or 20' and 18 should be only about as great as that required for the maximum travel of the main assembly, which is no greater than that required to allow the parts to be relatively disposed from the position of FIGURE 1 to their approximate maximum operated position as shown in FIGURE 4, when all brakes are operable. In the course of axial movement of either said subassemblies and/or said main assembly, the centering portion 71 is always disposed in the element 38, and the free end thereof is always spaced from the free end of threaded part 34 during said movement.

For effective bleeding, the bleed caps 24 and 26 and their respective seal washers are loosened, then the nut 37 is loosened only sufficiently so that the conical element 36 may be rotated within seat 30 by turning screw pin 33 as by applying a wrench to the hexogonal part 35. Assuming left hand thread on screw pin 30 at threaded end 34 and slip nut 38, the pin 30 is turned clockwise to cause slip nut 38 to travel axially towards the piston 37, whereby the shoulder 32 therein meets the free end of centering piston 71 and forces sub-assembly 2 to be moved axially towards closure 13 and with respect to the first sub-assembly. This action disturbs the sealed condition of face 55 to O-ring 49 and also forces foot 68, with stem carrying valve 67, against rear face of piston head 46 to unseat the valve 67, providing a continuous fluid path with parts of the device relatively disposed as shown in FIGURE 5. Upon completion of "bleeding" the safety device, the element 38 is to be returned to its normal position by rotating pin 33 in the opposite direction. The nut 37 must be tightened to make element 36 mechanically secure and fluidly tight on its seat 30. The bleed caps 24 and 26 and their respective seal washers are also made securely and fluidly tight, as shown in FIGURE 3.

As an example of another embodiment of my invention within the scope thereof, the chamber means, instead of being formed as a single member 11, may be separated as a main chamber defining a cylinder in which a relatively large piston such as 44, reciprocates, and a separate control and fluid-transfer chamber, defining a cylinder, comparable in size with or smaller than the portion 47. A relatively small piston, such as 57, reciprocates in said fluid-transfer cylinder to open or close an aperture in a partition transversely dividing the transfer chamber into a fluid-receiving or up-stream portion and a fluid-transmitting, pressure-sensing or down-stream portion, thus forming cavities respectively corresponding with those designated as 1 and 2.

In this embodiment, a valve, such as 67, is opened upon close approach of the small piston which carries it to the partition, instead of to the large piston. The first spring, such as 75, is here disposed in the up-stream portion of the small transfer chamber, to effect sealing of fluid-sealing face 55 to O-ring 49, while the second spring, such as the stronger one 77 of the first embodiment, is in the down-stream portion of the main chamber, to act on the corresponding end of the large piston. The up-stream ends of these cylinders, as well as the down-stream ends thereof, are connected by suitable fluid-transmitting pipes.

As a further embodiment, the part of the chamber means of either of the previously described embodiments which forms an annular stop portion such as that designated 18, may be provided by the end of a liner or tube inside and fastened to a cylinder of uniform diameter. Such a liner may abut a stop shoulder, such as 50, on the piston or the adjacent extreme end of said piston as desired. Also I may, if desired, substitute a floating disc valve for that designated 67. Such a disc valve would move between an open stopped position and one where it closed an aperture in the smaller piston such as 57. A stud or other member could be moved by the larger piston, such as 44, to effect opening of said valve.

Having now described my invention in detail in accordance with the requirements of the patent statutes, those skilled in this art will have no difficulty in making changes or modifications in the individual parts or their relative assembly in order to meet specific requirements or conditions. Such changes and modifications may be made without departing from the scope and spirit of the invention, as set forth in the following claims.

I claim:

1. A safety device including chamber means having an inlet opening at one end for connection to an hydraulic pressure fluid-supplying conduit and an outlet opening at the other end to which an hydraulic pressure fluid transmitting portion may be connected, said chamber means defining cylinder means, a relatively-large piston reciprocable in the cylinder means, an aperture for the flow of fluid between opposite ends of said piston, a relatively-small piston normally covering said aperture, a valve in said small piston spring biased to closed position but opened upon close approach of said small piston to said aperture, a first spring urging the small piston toward the outlet opening to normally close said aperture, and a second spring normally urging said large piston toward the inlet opening, whereby when the pressure of fluid at the inlet opening increases, the large piston is moved thereby and the valve is unseated, allowing said fluid to freely pass through the device to the outlet opening, but if the pressure of the fluid at the inlet opening decreases slightly, fluid returns freely to the inlet opening, while if the pressure at the outlet opening decreases to near zero, as upon rupture, the first spring returns the parts to a seating condition, stopping flow from said outlet opening.

2. A safety device as recited in claim 1, wherein the small inner piston has a portion extending toward the inlet end of the cylinder means through and beyond the apertured portion, a disc head secured to the free end of said extension, and packing means for checking any flow through said aperture when said inner piston moves to its limit toward the outlet end of the cylinder means.

3. A safety device as recited in claim 1, wherein said valve is guided with respect to an opening in the inner piston for movement from and toward a seat formed around said opening, means to move said valve to open position upon relative movement of the small piston toward the inlet opening, and a compression spring acting on said valve to normally hold it closed.

4. A safety device as recited in claim 1, wherein stop means are provided in the cylinder means to define the extremes between which the large piston may reciprocate.

5. A safety device as recited in claim 4, where the stop means towards the outlet end of the cylinder means is formed by annular means at the junction of a portion of the cylinder means adjacent said outlet opening and the remainder of said cylinder means.

6. A safety device as recited in claim 1, wherein the chamber means comprises a chamber defining a cylinder, the relatively small piston is an inner piston telescopically reciprocable in the relatively large piston, which is an outer piston, and has an aperture for the flow of fluid therethrough between opposite ends thereof, the relatively-small piston normally covering said aperture, the valve is opened upon close approach of the pistons to one another, the first spring urges the small piston away from the large piston to normally close the aperture, and the second spring urges the large piston away from the small piston.

7. A safety device as recited in claim 6, wherein the outer piston has a cylindrical portion of reduced section extending toward the outlet end of the chamber, the portion toward the inlet end of the chamber forming an annular portion around said reduced section to engage means limiting movement of said outer piston toward the outlet end of the cylinder.

8. A safety device as recited in claim 6, wherein the chamber comprises an axially elongated cup-shaped closure having an outlet opening offset from its axis and an outwardly-projecting axial boss with a central aperture, a screw pin received in said aperture and provided with a frustoconical valve portion adapted to engage a correspondingly-shaped seat on said boss, a sealing unit through which said pin passes and which threadably engages the boss for holding said valve portion seated, a dual internal diameter element threadably carried by said screw pin for holding the inner piston against the outer piston to effect opening of the valve for bleeding purposes, and means to prevent turning of said dual element with the screw pin.

9. A safety device as recited in claim 8, wherein the outer piston divides the cylinder into two cavities, there is an air-bleed hole from each cavity, and a bleed cap and washer for normally closing both of said holes.

10. A safety device as recited in claim 9, wherein the inner piston is telescoped within said cylindrical extension of the outer piston, carries a valve which is opened by engagement with said outer piston, and externally operable means for holding said pistons in engagement.

11. A safety device as recited in claim 1, wherein the chamber means is formed as a main chamber defining a cylinder in which the relatively-large piston may reciprocate and a separate control and fluid-transfer chamber defining a cylinder in which the relative-small pistons may reciprocate, the aperture is in a partition transversely dividing the transfer chamber into fluid-receiving and pressure-sensing portions, the valve is opened upon close approach of said small piston to the partition, the first spring is in the fluid-receiving portion, the second spring is in the main chamber, and the corresponding ends of the chambers are connected for the flow of fluid therebetween.

12. In combination with a conduit having hydraulic pressure fluid-supplying and hydraulic pressure fluid-transmitting portions, a safety device including chamber means having an inlet opening to which said fluid-supplying portion is connected and an outlet opening to which said fluid transmitting portion is connected, said chamber means defining cylinder means, a relatively-large piston reciprocable in the cylinder means, an aperture for the flow of fluid between opposite ends of said piston, a relatively-small piston normally covering said aperture, a valve in said small piston spring-biased to closed position but opened upon close approach of said small piston to said aperture, a first spring urging the small piston toward the outlet opening to normally close said aperture, and second spring normally urging said large piston toward the inlet opening, whereby when the pressure of fluid in the supplying portion increases, the large piston is moved thereby and the valve is unseated, allowing said fluid to freely pass through the device to the transmitting portion, but if the pressure of the fluid in the supplying portion decreases slightly, fluid returns freely to the pressure-supplying portion, while if the pressure in the transmitting portion decreases to near zero, as upon a rupture, the first spring returns the parts to a seating condition, stopping flow from said device to the transmitting portion.

13. In a combination as recited in claim 12, wherein there is a cylindrical portion projecting from the large piston along the cylinder means and in which the small piston telescopes, means on the opposite side of the large piston, but operated by the small piston, for closing the aperture when the small piston is moved from the supplying portion, and when the large piston is moved by an increase in the pressure of fluid in the supplying portion, said fluid is allowed to pass through said aperture.

References Cited

UNITED STATES PATENTS 1,724,881    8/1929    Lund _____ 303—84

FOREIGN PATENTS 733,940    4/1943    Germany.

MARTIN P. SCHWADRON, *Primary Examiner.*

ROBERT R. BUNEVICH, *Assistant Examiner.*